United States Patent [19]

Frazier, Jr.

[11] Patent Number: 4,730,340

[45] Date of Patent: Mar. 8, 1988

[54] PROGRAMMABLE TIME INVARIANT COHERENT SPREAD SYMBOL CORRELATOR

[75] Inventor: William R. Frazier, Jr., Indialantic, Fla.

[73] Assignee: Harris Corp., Melbourne, Fla.

[21] Appl. No.: 202,649

[22] Filed: Oct. 31, 1980

[51] Int. Cl.$^4$ .............................................. H04K 1/00
[52] U.S. Cl. ........................................ 375/1; 380/34; 380/35
[58] Field of Search .................... 364/604, 728; 375/1, 375/2.1, 2.2; 380/34, 35

[56] References Cited

U.S. PATENT DOCUMENTS

| | | | |
|---|---|---|---|
| 3,924,186 | 12/1975 | Gordy et al. | 375/1 |
| 4,071,906 | 1/1978 | Buss | 364/604 |
| 4,112,372 | 9/1978 | Holmes et al. | 375/1 |
| 4,221,005 | 9/1980 | La Flame | 375/1 |
| 4,225,935 | 9/1980 | Zscheile, Jr. et al. | 375/1 |
| 4,241,312 | 12/1980 | Barnes et al. | 375/1 |
| 4,270,180 | 5/1981 | Charlton | 364/604 |
| 4,285,060 | 8/1981 | Cobb et al. | 375/1 |
| 4,295,204 | 10/1981 | Sunstein | 364/604 |
| 4,308,617 | 12/1981 | German, Jr. et al. | 375/1 |
| 4,346,475 | 8/1982 | Alexis | 375/1 |

OTHER PUBLICATIONS

S 7423009SP, pp. 144–154, Spread Spectrum Techniques, Davies et al.

S 18450009, IEEE Proc., vol. 128, Pt. F., No. 6, (11/81), pp. 370–378, Hjelmstad et al.

Primary Examiner—Salvatore Cangialosi
Attorney, Agent, or Firm—Antonelli, Terry & Wands

[57] ABSTRACT

An hybrid array correlator is configured of a cascaded array of individually identical correlator cells, through which a preselectable reference symbol sequence, identifiable with a symbol to be acquired, is successively clocked, from cell to cell and then recirculated back to the beginning or first cell of the array. The physical span of the correlator covers one complete symbol time, with each cell imparting a one-half chip delay to the reference spreading sequence as it is clocked through the correlator. Yet, because of the recirculation of the reference spreading sequence from the last cell back to the first cell, the electrical span of the correlator is effectively infinite or time invariant. An incoming unknown symbol sequence capable of being acquired is applied in parallel to all the cells of the correlator array. Regardless of the time of arrival or phase of this incoming spreading sequence, in one of the cells of the correlator, the reference spreading sequence will have a phase that is effectively aligned with that of the incoming signal and, assuming that the incoming symbol sequence is associated with that matched filter, this particular correlator cell will produce a strong correlation output at the completion of the duration of the symbol span, thereby indicating that the symbol has been detected.

20 Claims, 9 Drawing Figures

FIG. 1.
| MESSAGE ELEMENT | GROUP | SYMBOL PAIR | SYMBOL DEFINITION |
|---|---|---|---|
| 0 0 | 1 1 1 1 | +M1, +M1 | +M1 = 1 1 |
| 0 1 | 1 1 0 0 | +M1, −M1 | −M1 = 0 0 |
| 1 0 | 1 0 1 0 | +M2, +M2 | +M2 = 1 0 |
| 1 1 | 1 0 0 1 | +M2, −M2 | −M2 = 0 1 |
FIG. 2.
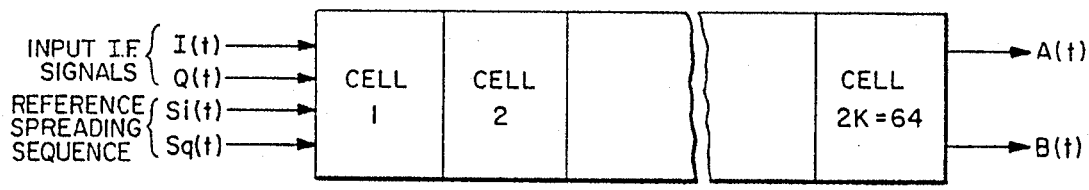
2K CELL HYBRID ARRAY CORRELATOR
FIG. 3.
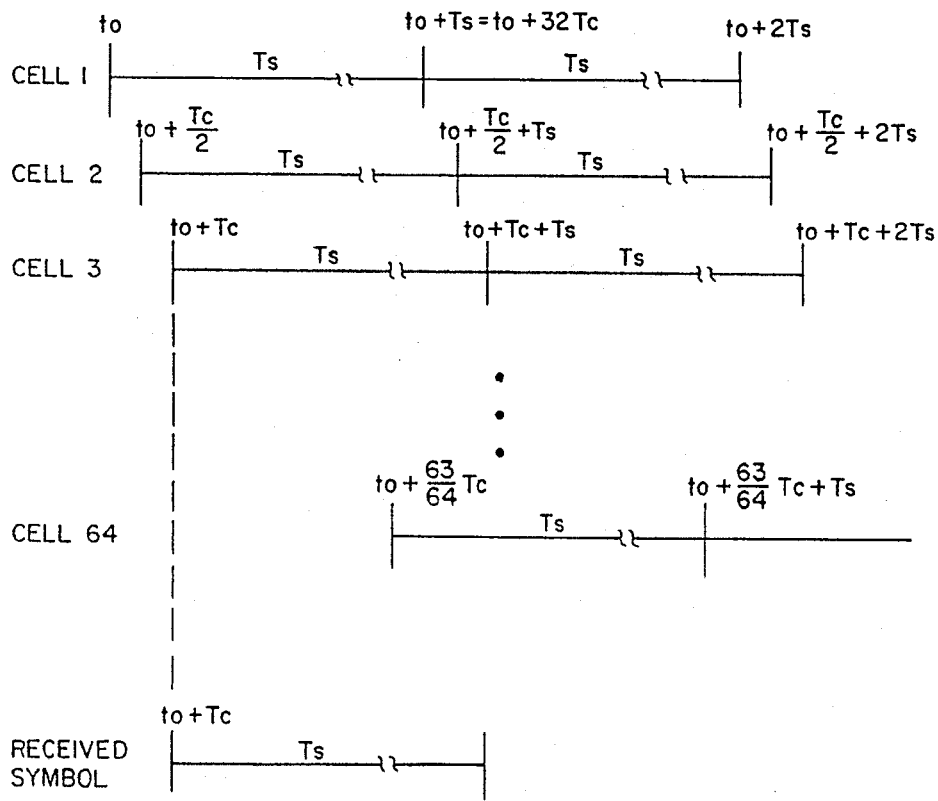

SINGLE BIT

N BIT DECISION

PROGRAMMABLE TIME INVARIANT COHERENT SPREAD SYMBOL CORRELATOR

The U.S. Government has rights in this invention pursuant to contract No. N62269-79-C-0013 awarded by the Department of the Navy.

FIELD INVENTION

The present invention relates to command, control, and communication systems, and is particularly directed to a scheme for the acquisition, synchronization, and recovery of coherently coded and combined spread spectrum symbol formats. In particular, the present invention is directed to a matched filter scheme for such a system formed of an improved hybrid array correlator, that is effectively a time invariant coherent spread symbol correlator and is programmable.

BACKGROUND OF THE INVENTION

With the continuing development of sophisticated command, control, and communication data processing systems, spread spectrum communication techniques have drawn particular attention because of a number of advantages they offer over more conventional and limited bandwidth modulation schemes. One advantage is the capability of enabling the communication link to exhibit a robustness against jamming or natural interfering signals which are not correlated with the particular spreading waveform. These interference signals may include jamming, randomly distributed natural events, or other users of the same spectrum. A further advantage is that a signal-to-noise improvement may be obtained by systems which employ a plurality of codes (symbol alphabet) by transmitting a sequence of spread symbols whose energy distance has been maximized and equalized to enhance the decision thresholds as opposed to using an uncoded signal. In addition, enhanced time resolution may be obtained with the increased bandwidth.

The advantages of employing such a communication scheme are not obtained with ease, however, as part of the price one must pay is the complexity of the signal processing required to extract the useful information or data and the complexity of acquisition and synchronization processes needed. Typical modulation schemes employ coded sequences to define symbols which transmit each code bit of information, so that, at the receiver, some form of correlation or matched filtering, matched to each symbol of the symbol alphabet, is required to synchronize the receiver to the transmitter and extract the original data.

More specifically, as is well known, a signal waveform, or its complement, can be used to transmit a data symbol at some bit rate $f_B = 1/T_B$ on a carrier $f_c$, with the bandwidth being determined by the duration of the chip $T_C = T_B/N_C$ (where $N_C$ is the number of chips per symbol) rather than symbol duration. This results in an increase in the bandwidth by a factor of $N_C$ yielding a spread spectrum signal. A conventional technique for detecting and decoding the data stream involves the use of a correlation receiver in which locally generated replicas of the symbol sequence are mixed with the incoming signal. Unfortunately, precise chip synchronization must be maintained, resulting in system complexity which makes this approach disadvantageous.

An alternate solution to data detection is the use of a matched filter receiver. In this case, different biorthogonal pseudo random sequences may be chosen to define the respective symbols in the symbol alphabet to be transmitted and, for a signal alphabet more complex than a binary one, a given number of information bits can be transmitted at a specified error rate with less total energy than is required for an optimum antipodal energy signal. In exchange for a savings in required bit energy, however, one must trade off increased bandwidth and equipment complexity.

In one such type of communication scheme, commonly termed M-ary transmission, an alphabet of $M = 2^K$ symbols is defined, with the transmission of one symbol comprising $\log_2 M = K$ bits of binary data. Each symbol consists of a sequence of n elementary signals or chips, with $n << K$, typically, in order for each member of the alphabet to be orthogonal to all other members. The symbol spreading can be done in one phase (BPSK) by N chips or on two quadrature phases, (QPSK) N I-phase chips and N Q-phase chips, with or without staggering the I and Q chip transitions.

Optimal processing at the receiver requires the incoming signal to be correlated with one of M possible symbol waveforms. The receiver determines the most probable waveform to be that waveform having the highest degree of correlation as measured by the M receiver correlators. This decision minimizes the probability of error.

Previous attempts to manufacture a device for this purpose have included the CCD correlator, the optical Bragg cell correlator, the digital sum correlator, the SAW Fourier Transform correlator, the programmable SWD tapped delay correlator and the SWD airgap and elastic convolvers.

In operation, several of these correlators typically quantize and then delay the incoming signals for implementing the signal matching process. At the end of the symbol duration Ts a correlation pulse output is produced if the input signal matches a prescribed reference signal. Unfortunately, quantization of the input coded signal requires a high level of digital encoding in order to pass the wide dynamic range of input signals to be processed. This normally means that the input signal must be coded with from eight to twelve bits in order to provide adequate dynamic range. This increases the complexity of the hardware and substantially increases processing problems.

Moreover, these devices suffer from a number of other disadvantages such as large size, high power consumption, low delay stability, limited temperature range, high cost, low reliability, low dynamic signal range, high distortion and insertion loss, non-coherent output of the type most suitable for a multi-symbol coherent decoding process, and limited time-bandwidth products. As a result, these types of correlators are not suitable for systems whose signal formats require demodulation with ultra high speed PN and carrier phase acquisition.

SUMMARY OF THE INVENTION

In accordance with the present invention, there is provided an improved matched filter correlator that has particular command, control, or communication applications, but does not suffer from the above-described drawbacks of prior art approaches to signal acquisition, synchronization, and recovery of coherently coded and combined spread spectrum symbol formats. For this purpose, the matched filter correlator of the present invention is configured to be effectively time invariant, so that regardless of the time of arrival of an incoming symbol relative to a reference symbol signal, the correlator is continuously capable of acquiring the data, and is not limited by the need for complex signal synchronization circuitry; nor is it limited by some finite signal observation window, outside of which incoming signals would not otherwise be acquired.

In order to effect this time invariant property, the hybrid array correlator of the present invention is configured of a cascaded array of individually identical correlator cells, through which a preselectable reference symbol spreading or coding sequence, identifiable with a symbol to be acquired, is successively clocked, from cell to cell and then recirculated back to the beginning or first cell of the array. The physical span of the correlator covers one complete symbol time, with each cell imparting a one-half chip delay to the reference spreading sequence as it is clocked through the correlator. Yet, because of the recirculation of the reference spreading sequence from the last cell back to the first cell, the electrical span of the correlator is effectively infinite or time invariant. An incoming unknown symbol sequence capable of being acquired is applied in parallel to all the cells of the correlator array. Regardless of the time of arrival or phase of this incoming spreading sequence, in one of the cells of the correlator, the reference spreading sequence will have a phase that is effectively aligned with that of the incoming signal and, assuming that the incoming symbol sequence is associated with that matched filter, this particular correlator cell will produce a strong correlation output at the completion of the symbol span, thereby indicating that the symbol has been detected.

Advantageously, in a preferred embodiment of the invention, the hybrid array correlator may be configured using CMOS integrated circuit techniques, employing sets of field effect transistor (FET) switches and associated symbol span integrator circuitry at the outputs of the FET switches to perform the correlation.

In accordance with a further aspect of the present invention, there is provided a communication technique with respect to which the hybrid array correlator has particular utility by extending the rapid acquisition and coherent correlation processing to span group vectors many times the length, and/or, for example, time bandwidth product, of a single symbol. Pursuant to the communication technique, the composition of digital data messages is encoded into coherent message groups consisting of a coherent sequence of M-ary symbols. Each member of the group so comprised exhibits maximized and equalized energy distance to other members of the group. The sequence of symbols that make up each group are represented by the PN spreading sequences which define the individual symbols, some preselected number of K chips in length multiplied by the number of symbols in a group code vector. In the signal acquisition circuitry at the receiver, each matched filter hybrid array correlator according to the present invention is effectively programmable, in that the reference spreading sequence that is to be continuously recirculated through the cells of that respective matched filter is preselected to correspond to each of the symbols of which an encoded data group may be comprised.

The outputs of the set of matched filters in the receiver that is capable of detecting any symbol of which the transmitted message may be formed are coupled to data recovery signal processing circuitry which operates on or processes the matched filter outputs pursuant to a coherent maximum likelihood decision process for determining the most likely message group that was originally transmitted. The decided-upon message group is then converted or decoded into the original digital data. Thus, coherent detection of a group consisting of a plurality of symbols is achieved without complex synchronous detection processing or high time bandwidth product correlators.

The programmability feature of the present invention is especially advantageous in that it permits each correlator to be adjustable, so as to satisfy code validity interval requirements governing anti-jam systems. The adjustability of each correlator is capable of being carried out in a gradual or "soft edged" manner over the duration of the code validity interval, so that the possible loss of symbol acquisition capability at the receiver caused by modest timing drift for each new successive spreading code sequence is avoided. For this purpose, the spreading sequences, by way of which each symbol capable of being transmitted is defined, are changed in the transmitter and receiver on a random chip-by-chip basis, with each chip position in a sequence being selectively altered, in accordance with the new symbol to follow in the next code validity interval, once during the code validity interval. As a result, the correlation properties of the symbol format degrade gracefully as the timing uncertainty increases over the code validity interval, enabling the communication scheme pursuant to the present invention to be especially suitable for a multitude of sophisticated signal acquisition synchronization and data recovery requirements, while having a high degree of anti-jam capability.

BRIEF DESCRIPTION OF THE DRAWINGS

FIG. 1 is a table showing an exemplary format of the message encoding scheme in accordance with the present invention;

FIG. 2 is a general block diagram illustration of a hybrid array correlator with sixty four cells;

FIG. 3 is a timing diagram useful in explaining the operation of the multi-cell hybrid array correlator shown in FIG. 2;

DETAILED DESCRIPTION

Figure 4:
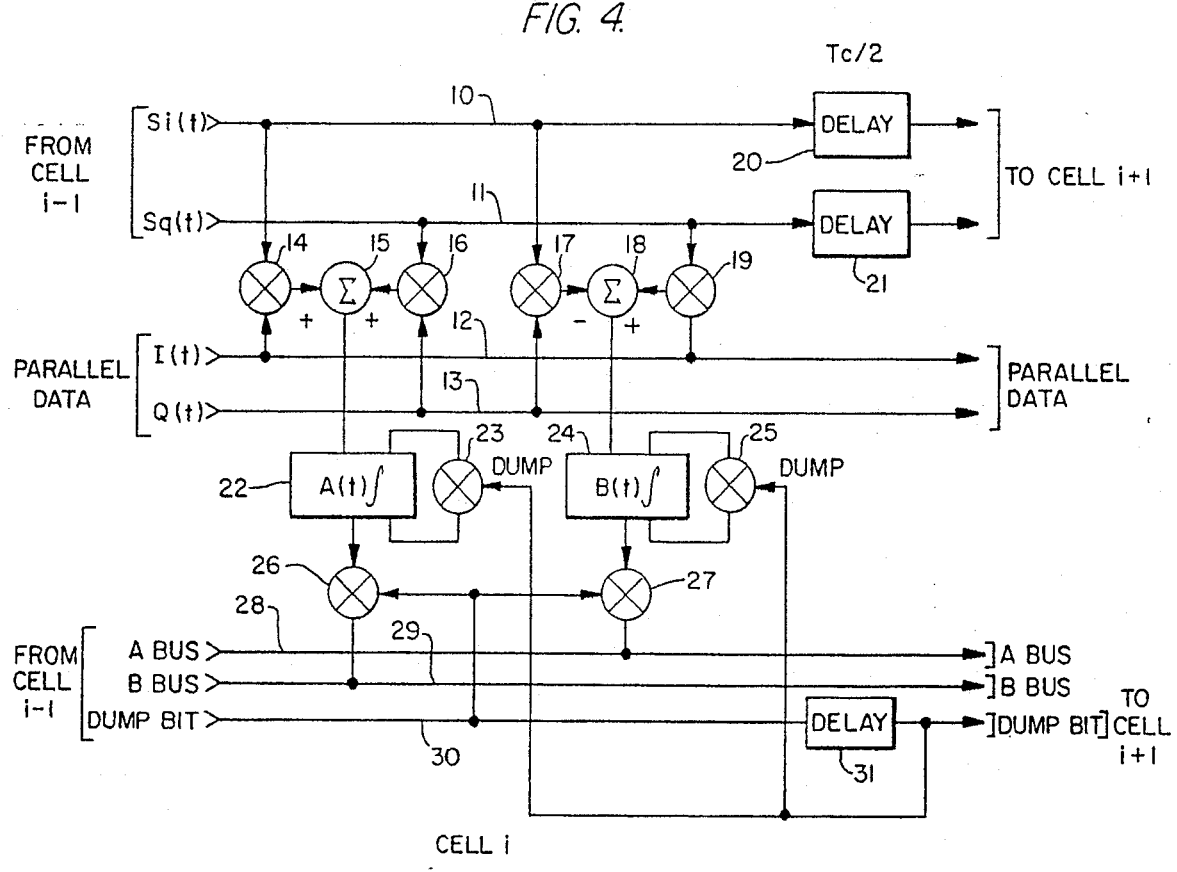
FIG. 4 is a general schematic block diagram of an individual correlator cell of the hybrid array correlator of FIG. 2.

Prior to describing an illustrative implementation of the circuitry configuration of a communication system embodying the principles of the present invention, including the hybrid array correlator referenced above, a discussion of the communication technique involved will be initially presented. As was indicated briefly above, this communication technique has the particular advantage that it is capable of providing ultra fast signal acquisition and, unlike conventional data transmission systems, including those employing commonly adopted spread spectrum techniques, does not require signal tracking circuitry such as PN tracking and coherent carrier phase lock loops.

In order to facilitate the description to follow and to provide a ready understanding of the data encoding and communication technique carried out in accordance with the present invention, the message assembly format will be explained with reference to a simplified encoding format although, as will be discussed below, the technique employed may be practically realizable on a much larger scale; advantageously, the basic hybrid array correlation and data recovery scheme is still employed regardless of the complexity of the manner of assembly of the signalling format.

Attention is directed to FIG. 1 which shows an exemplary format of the encoding scheme employed in accordance with the present invention. For purposes of simplification, consider an arbitrary digital sequence of ones and zeros representative of a message to be transmitted, e.g. in the basic form: 10110001 . . . . The components of the series, namely the ones and zeroes may be subdivided into sets of any chosen size, such as two, three, four, etc., bits per set. Keeping with the intended simplification of the present description, let us consider each set to comprise a pair of bits as the basic message element. For a pair of bits, there will be $2^2$ or four possible message elements, i.e. 00, 01, 10, and 11. (For a higher order set assembly, such as sets of three (i.e. n=3) the number of possible message elements that may be derived from an incoming digital sequence will increase, of course, and obey the relationship $N=2^n$, where N is the number of possible sets and n is the number of bits per set.

Now, for each basic message element or set, a group of symbols will be assigned. These groups of symbols are chosen to be biorthogonal. In the example chosen, for message elements of two bits each, the groupings shown in FIG. 1 have been given as illustrative; i.e. message element 00 will be encoded as group 1111, element 01 as group 1100, element 10 as group 1010 and element 11 as group 1001. Note that this is a Hamming distance 2 code with common lead element. Other EDAC codes can be implemented in this same manner. The constituency of each group is subdivided into an alphabet of symbols preserving the orthogonality of the assembly. In the grouping shown in FIG. 1, an alphabet of symbols may be selected such that +M1=11, its complement —M1=00, +M2=10, and its complement —M2=01. Thus, the illustrated orthogonal groups may be considered to be comprised of pairs of symbols as shown in the "SYMBOL PAIR" column of the Figure. This grouping provides a maximum and equalized energy distance between the symbols. It should be observed that the number of symbols in the alphabet selected may be and is, practically, considerably larger than the quaternary alphabet illustrated here. The most useful range is two to sixteen symbols in length.

Now, for purposes of actual data transmission, each symbol is represented by a sequence of K chips, BPSK encoding or 2K chips, QPSK encoding. Here, there is shown the more complex QPSK encoding case which includes both a K chip in-phase and a K chip quadrature spreading function sequence. With present day signalling equipment chip durations of 37.736 nanoseconds may be selected as an example. Thus, for each symbol there will be a K chip in-phase sequence $S_i(t)$ and a K chip quadrature sequence $S_q(t)$. The magnitude of K may be varied depending upon the encoding sophistication chosen. For purposes of the present description, K will be chosen to be K=32. Again, however, chip durations of K=16 to 128, or even on the order of several thousand may be employed. The exemplary number (K=32) chosen here is merely for purposes of providing an illustrative embodiment. With a duration of 32 chips per symbol, each group vector consisting of two symbols will have a total chip duration of 64 chips; e.g. for message set "10" the corresponding group "1010" is defined by the sequence alphabet symbols (+M2), (+M2) yielding a duration of 32+32=64 chips. Each symbol is preferably quadrature modulated onto the transmission carrier, so that for the exemplary message set above, there will be transmitted an alphabet spreading function pair $Si_{+M2}(t)$ and $Sq_{+M2}(t)$ followed by the same quadrature signals $Si_{+M2}(T)$ and $Sq_{+M2}(T)$.

Before explaining the manner in which these symbols are generated and transmitted, the present description will focus upon the signal acquistion technique, particularly the hybrid array correlator employed in the receiver, by way of which data recovery is achieved. Initially, it is to be observed that the improved signal acquisition, hybrid array correlator arrangement in accordance with the present invention, is operative, in general, on a constant envelope spread signal of the form $e(t)=D(t) [Si(t) \sin (\omega t+\theta)+Sq(t) \cos (\omega t+\theta)]$, where D(t) is the data modulation, Si(t) and Sq(t) are quadrature PN spreading functions and $\theta$ is the unknown signal carrier arrival phase. Note that for BPSK signalling, Sq(t)=0. Now, for a constant envelope signal the sum of the squares of the spreading functions is constant, i.e. $Si^2(t)+Sq^2(t)=$ Constant.

Prior to operating on the received signal having the general form indicated above, in accordance with the present invention, the received modulated carrier is down-converted to an I.F. frequency, and then the in-phrase (I) and quadrature (Q) components are further converted down to baseband and separated into separate channels. For this purpose, the incoming spread I.F. signal e(t) is applied to a pair of mixers, to which the output of a local oscillator is applied directly and through a 90° phase shift, respectively; i.e. to one mixer is applied a signal Sin $\omega t$ and to the other mixer is applied a signal Cos $\omega t$. The outputs of the mixers are coupled to respective low pass filters to remove the double I.F. frequency components, thereby yielding an in-phase component $I(t)=D(t) [Si(t)\cos \theta - Sq(t)\sin\theta]$ and a quadrature component $Q(t)=D(t)[Si(t)\sin \theta +Sq(t)\cos\theta]$. These respective signals are applied to a set of matched filters, each respective one of which is programmed to be responsive to a particular symbol. Thus, for the four symbol grouping described above, there will be four matched filters. In accordance with the present invention, the four matched filters are configured using two, i.e. the number of symbols used to define the group vectors, hybrid array correlators each of which is effectively a time invariant correlator. Namely, as will be explained in detail below, the correlation function of the filter looks for an incoming symbol identified with it, continuously, not merely over a preestablished interval. For this purpose, an individual matched filter according to the present invention is generally configured as shown in FIG. 2.

As shown in FIG. 2, the correlator comprises a plurality of correlator cells, an individual one of which will be described in detail below in conjunction with the description of FIG. 4, connected in cascade with a one-half chip delay between successive stages. Each correlator cell correlates the in-phase and quadrature components of the baseband signal (I(t) and Q(t)) with in-phase and quadrature reference spreading sequences Si(t) and Sq(t). For this purpose, rather than delay the unknown I(t) and Q(t) signals and applying these signals to separate correlators in series, the hybrid array correlator of the present invention delays the reference spreading functions a one-half chip delay period for each cell and couples the incoming I(t) and Q(t) in parallel to each cell. The result achieved from this approach is shown by the timing diagram of FIG. 3.

More particularly, each correlator cell looks continuously at the incoming in-phase I(t) and quadrature Q(t) components of the received signal and correlates these signals with some delayed version of the spreading signals Si(t) and Sq(t). Assuming, for the matched filter of interest, that the incoming signal contains a symbol chip sequence associated with that particular matched filter, but the time of arrival and carrier phase $\theta$ which is unknown then one of the 2K correlator cells will receive the reference spreading function in time alignment with the incoming unknown signal and will produce an output representative of a large valued correlation between the two signals. For the timing signal diagram shown in FIG. 3, the incoming signal is not in time alignment at $t_o$ with the spreading function applied to the input of the correlator but is, instead, delayed by $\tau$ relative to $t_o$. For purposes of illustration, let it be assumed that $\tau$ is approximately one chip time, i.e. Tc; since the spreading function is delayed one-half chip time by cell number one and one-half chip time by cell number two then the passage of the spreading function through cell number three will be in time alignment with the incoming signal in that same cell and cell number three will produce a strong correlation output at the completion of the symbol integration at the time $t_o + \tau s + Tc$, indicative of a match between the incoming unknown signal and the reference spreading function defined by the symbol associated with the cell of interest.

Now, as was pointed out above, the total span of the correlator is equal to the total chip duration of the symbol, i.e. 32 chips for the symbol duration in the present example, for a total correlator span of 64 cells. In order to make the matched filter time invariant, the spreading sequence derived from the delay stage of the last cell (here, the 64$^{th}$ cell) is looped back to the first cell. Namely, at any point in time ti, the definition of the spreading function is the same at integral multiples of Ts, plus ti, where Ts is the span of the symbol. This means that for time of arrival $t_o + \tau$ of an incoming signal, one of the cells 1–64 will provide a strong correlation output, at the completion of its $\tau s$ integration. This time invariant property of the hybrid array correlator is particularly significant since it means that receiver is always capable of acquiring an incoming symbol, not being limited by an expectancy window.

A schematic block diagram of an individual hybrid array correlator cell is shown in FIG. 4. Each cell operates to produce a pair of outputs indicative of the cross-correlation of the in-phase and quadrature components of the reference spreading function and the in-phase and quadrature components of the unknown received signal. Namely, each cell produces a first output $A = \int (I(t)Si(t) + Q(t)Sg(t))dt$ and $B = \int (I(t)Sq(t) - Si(t)Q(t))dt.$ For this purpose, the in-phase component of the spreading function is coupled over line 10 to one input of a pair of multipliers 14 and 17 and to a one-half chip delay circuit 20. A second input of multiplier 14 is coupled to line 12 over which the in-phase component I(t) of the received analog signal is applied, while a second input of multiplier 16 is coupled to line 13 over which the quadrature component Q(t) of the received analog signal is applied. Lines 12 and 13 are coupled in parallel to each cell of the correlator array. Similarly, the quadrature component Sq(t) of the reference spreading function is coupled over line 11 to one input of each of multipliers 16 and 19 and to a one-half chip delay circuit 21. A second input of multiplier 16 is coupled to receive the quadrature component Q(t) of the received signal over line 13, while a second input of multiplier 19 is coupled to receive the in-phase component I(t) of the received signal over line 12. Delay circuits 20 and 21 impart a one-half chip delay to the respective in-phase and quadrature components of the reference spreading function, to be coupled to the downstream adjacent correlator cell. Thus, the output of one-half chip delay circuit 20 corresponds to the in-phase spreading function coupled to the corresponding line 10 of the next successive cell, while the output of one-half chip delay circuit 21 corresponds to the quadrature spreading function coupled to the corresponding line 11 of the next successive cell.

The outputs of multipliers 14 and 16 are summed in adder 15, the output of which is coupled to integrator 22. The output of multiplier 17 is subtracted from the output of multiplier 19 in subtraction circuit 18, the output of which is coupled to integrator 24. Each of integrators 22 and 24 integrates its input over the duration of a symbol span, i.e. 32 chip times or the span of the correlator, and then couples the integrator outputs to an A bus 29 and a B bus 28, respectively. To this end, a gating circuit 26 is coupled between the output of integrator 22 and A bus 29, while a gating circuit 27 is coupled between the output of integrator 24 and B bus 28. Gating circuits are enabled by a gate enabling signal on line 30 which circulates through the correlator from one cell to the next. The enabling signal is delayed by a one-half chip delay circuit 31, so that for a 64 cell correlator, the enabling signal on line 30 reappears at a respective cell i once per symbol time Ts. The output of delay circuit 31 is coupled to a pair of dump circuits 23 and 25 which respectively discharge integrators 22 and 24 one-half chip time subsequent to gating the outputs of the integrators to their respectively associated A and B buses. For the constant envelope, spread signals considered here, the signals on the A and B buses may be defined as follows.

$A = \int (I(t)Si(t) + Q(t)Sq(t))dt = D(t) \cos \theta (Si^2(t) + Sq^2(t))$, and $B = \int (I(t)Sq(t) - Q(t)Si(t))dt = D(t) \sin \theta (Si^2(t) + Sq^2(t))$.

Figure 5:
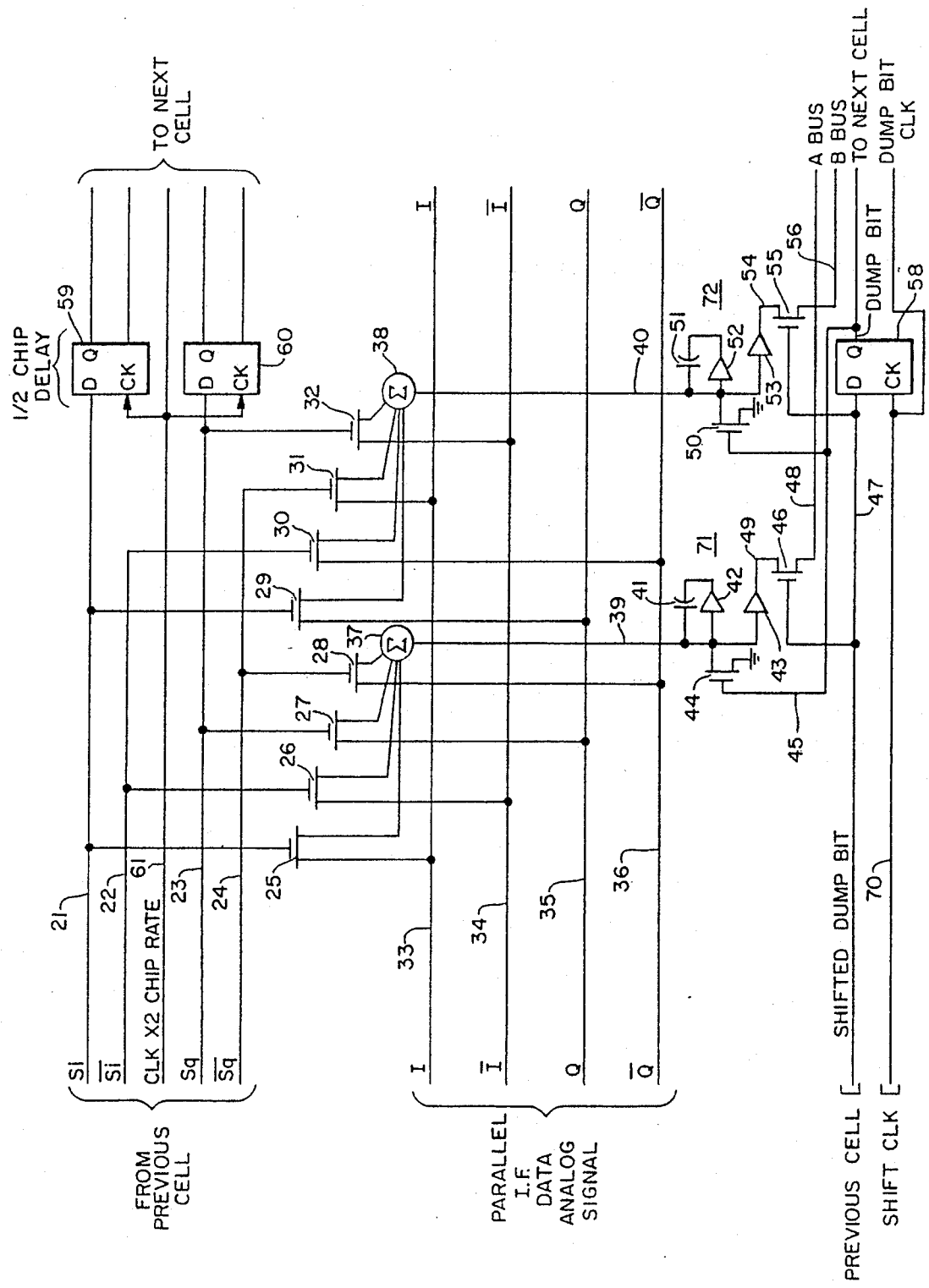
FIG. 5 is a detailed schematic diagram of an individual correlator cell of the hybrid array correlator, employing field effect transistor circuitry.

Thus, the outputs of the integrators on the A and B buses are indicative of the coherent data components and acquisition of a symbol by the receiver. In accordance with a preferred embodiment of the invention, each hybrid array correlator cell may be implemented using present-day integrated circuit techniques, such as through the use of CMOS IC technology. The manner in which such a cell may be so implemented is shown in FIG. 5.

For the quadrature modulation format chosen for describing an exemplary embodiment of the present invention, there are four reference signal lines 21 through 24 over which the reference pseudo-random spreading sequence is circulated. Line 21 carries the non-inverted in-phase component of the reference scrambling sequence and applies it to the gates of field effect transistor 25 and field effect transistor 29. Line 21 is also coupled to the D input of a delay flip-flop 59. Line 21 originally was derived from the Q output of the corresponding delay flip-flop of the previous stage. Line 22 carries the inverted version or complement $\overline{Si(t)}$ of the in-phase pseudo-random spreading sequence and couples it to the gate of each of field effect transistors 26 and 30. Line 22 is derived from the $\overline{Q}$ output of the in-phase delay flip-flop of the previous cell stage.

Line 23 carries the noninverted quadrature pseudo-random spreading sequence Sq(t) to the gate inputs of each of field effect transistor switches 27 and 30, and to the D input of the quadrature delay flip-flop 60. Line 23 is derived from the Q output of the quadrature delay flip-flop of the previous cell.

Line 24 carries the inverted version or complement $\overline{Sq(t)}$ of the quadrature phase component of the pseudo-random spreading sequence, derived from the $\overline{Q}$ output of the quadrature delay flip-flop of the previous cell and applies it to the gate inputs of field effect transistors 28 and 31.

Each of field effect transistors 25 through 28 has its drain coupled to a summing circuit 37, the output of which is coupled over line 39 to a Miller integrator 71. The drain of each of field effect transistors 29 through 32 is coupled to summing circuit 38, the output of which is coupled over line 40 to a second Miller integrator 72. The source of field effect transistor 25 is coupled to line 33 over which the non-inverted in-phase component I(t) of the received baseband signal is applied. Line 33 is also coupled to the source of field effect transistor 31 within this cell and is coupled to a corresponding set of field effect transistors 25 and 31 in each of the remaining cells. Line 34 carries the inverted version $\overline{I(t)}$ of the in-phase received signal and is coupled in parallel in each cell to the source of field effect transistors 26 and 32. Line 35 carries the non-inverted quadrature component Q(t) of the received signal in parallel to each cell and couples it to the source of transistors 27 and 29. Finally, line 36 carries the inverted version $\overline{Q(t)}$ of the quadrature component of the received signal in parallel to each cell and couples to the source of each of field effect transistors 28 and 30.

Miller integrator 71 is formed in a conventional configuration of an operational amplifier 42 and feedback capacitor 41. This integrator integrates the output of summing circuit 37 on line 39 and applies its output through a buffer 43 to the source input of a field effect transistor switch 46. Field effect transistor switch 46 is turned on by a signal on line 47 which is clocked through each cell of the correlator at a frequency of twice the chip rate so as to periodically read out the contents of the Miller integrator onto an A bus 48. Once the contents of the Miller integrator 71 have been read out, they are dumped by a reset field effect transistor switch 44 under the control of a signal on line 45.

In a similar fashion, the output of summing circuit 38 on signal line 40 is coupled to a Miller integrator 72, the output of which is coupled through a buffer 53 to the source input of a field effect transistor switch 55. When enabled, field effect transistor switch 55 couples the contents of Miller integrator 72 onto a B bus 56 for delivery to downstream signal processing circuitry. The contents of Miller integrator 72 are dumped or reset by a field effect transistor switch 59 under the control of signal line 45.

The exemplary cell shown in FIG. 5 also contains a delay flip-flop 58 which sequentially delays the signal on line 47 from one cell to the next to control the reading out of the Miller integrators via line 45 in each cell in sequence along the correlator.

Considering now the operation of each correlator cell, the K chip reference spreading sequence is continuously recirculated through 2K cells of the correlator under the control of a clock line 61, with each delay flip-flop 59 and 60 effectively imparting a one-half chip delay to the PN sequence as it is clocked through the correlator and recirculated in a ring-around fashion under the control of the clock signal on line 61.

As incoming signals are now received by the receiver, their respective quadrature and in-phase components, including both the inverted and non-inverted signals of each, are coupled in real time over lines 33 through 36 in parallel to each of the cells of the correlator. Since the delay of each cell is one-half a chip in length, the incoming analog signal on lines 33 through 36 will see a plurality (64 in the example chosen) of identical reference code PN sequences, but with each code being delayed by half a chip period relative to the code of an adjacent cell. Since the total symbol length is 32 chips, with the last half chip or $64^{th}$ cell being looped back to the first cell, the correlator is continuously providing a time invariant reference code with which any incoming signal whose PN symbol sequence matches that stored in the correlator may be compared for detecting the symbol.

This is accomplished by the selective turning on or gating of field effect transistors 25 through 28 and 29 through 32 under the control of the reference code sequences on lines 21 through 24. Assuming that the incoming symbol chip sequence is identified with the matched filter of interest, then, as a prior requirement, the non-inverted or inverted in-phase and quadrature components of that symbol sequence will be continuously clocked through the correlator over lines 21 through 24. In that one of the cells in which the symbol sequence is aligned with the reference code, flip-flops 25 through 28 and 29 through 32 will be gated on during those times which the signals are aligned. It is to be noted that the two sets of field effect transistors are provided to detect a normal input signal and one with a phase inversion, respectively. Thus, on output lines 39 through 40 in the cell in which there is time alignment of the input signal and the reference spreading signal, there will be supplied an output component to be integrated by the respective Miller integrators over the symbol time. At the end of the symbol time, that Miller integrator for the cell in which the signal match has occurred will be at a signal level indicative of the detection of a match, namely correlation between the incoming symbol and the time invariant reference code in the particular cell in which time coincidence between the incoming code and the reference code has occurred. At the end of the symbol duration as defined by the signal on line 47 as it is clocked through the respective cells, the outputs of Miller integrators 71 and 72 are respectively coupled to the A bus and B bus. The A and B bus outputs are thus multiplexed, i.e. sequentially scanned in time coincidence with the clocking out of the Miller integrators onto the A and B bus outputs of the hybrid array correlator. The output of the multiplexer is coupled to downstream processing circuitry to be described below. This downstream signal processing circuitry comprises a group maximum likelihood decision circuit, shown in FIG. 6.

The group maximum likelihood decision circuit comprises a set of signal combining circuits which are coupled to prescribed ones of the matched filters, so as to form respective symbol group detection circuits. More specifically, as explained previously in conjunction with the description of FIG. 1, each transmitted symbol group contains a sequence of symbols of the alphabet by way of which messages are transmitted. For the quarternary grouping employed in the illustrative example, each message element is representable by a pair of alphabet symbols, each of which is associated with one of the matched filters described above. For the symbol alphabet chosen for the present example, two matched filters 102 and 103 are coupled to an input link 101 over which received I.F. signal is coupled. Each of matched filters is configured in the manner of the hybrid array correlator described in detail above with reference to FIGS. 2 through 5. It will be understood, of course, that the reference spreading sequence contained in each filter is exclusive of the symbol for which the filter is defined.

Figure 6:
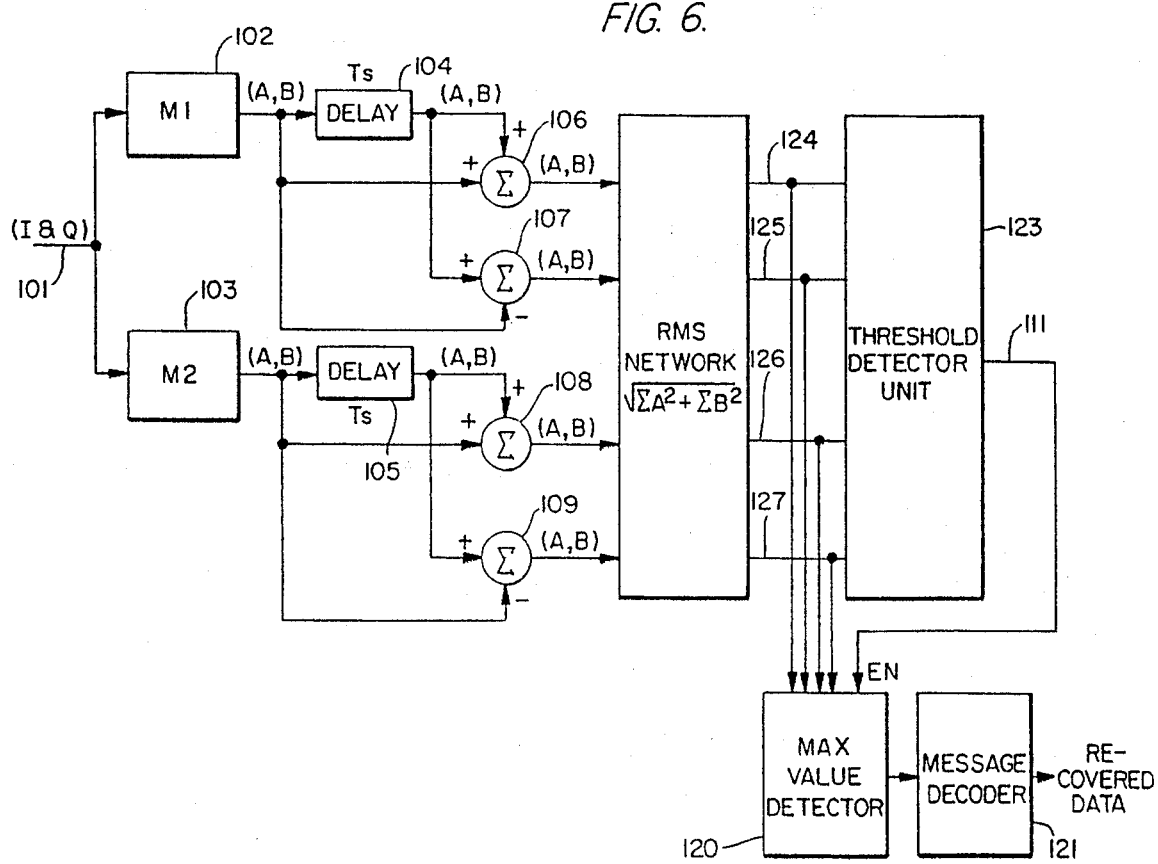
FIG. 6 is a schematic block diagram of symbol sequence decision circuit associated with a plurality of matched filter hybrid array correlators in a receiver.

Now, the purpose of the decision circuit shown in FIG. 6 is to detect those symbol sequences of which message groups are comprised. Accordingly, the A and B bus outputs of the matched filters are selectively combined in accordance with the respective groups into which the message elements may be encoded so as to form a set of group detectors. With the alphabet example described above, there are a total of four possibly transmitted groups, having associated symbol sequences +M1,+M1; +M1,−M1; +M2,+M2; and +M2,−M2. To detect these symbol sequences, the output of matched filter 102 is coupled to a delay circuit 104, which effectively delays the A and B bus outputs of matched filter 102 by one symbol time. Thus for example, if it was desired to detect the message group 1111, corresponding to message element 00, one would look for the symbol +M1, followed again by the symbol +M1. To do this, the A and B outputs, respectively, of matched filter 102 and the A and B outputs, respectively, of delay circuit 104 are summed in a dual line adder 106. Adder 106, the output of which is coupled to an RMS calculation network 110. This network receives the respective A and B outputs of signal combining circuits 106-109 and produces an output representative of the square root of the sum of the square of the inputs. For this purpose, network 110 may comprise a set of conventional square law diode detectors. Thus, for the output of adder 110, network 110 produces an output on line 124 representative of $\sqrt{\Sigma A^2 + \Sigma B^2}$ for message group 1111. Similarly, for message group 1100, network 110 produces an output in line 123 representative of $\sqrt{(A_{M1}-A_{M2})^2+(B_{M1}+B_{M2})^2}$. Each of the output lines 124-127 is coupled to a threshold detector unit 123. Threshold detector unit 123 contains a set of threshold detectors, one for each group, coupled to the outputs of network 110 and to a reference voltage source. The other inputs of network 110 are connected to the output of adder 108 and to the outputs of subtraction circuit 107 and 109. Subtraction circuit 107 subtracts the output of matched filter 102 from the output of delay circuit 104, so as to produce an output representative of the symbol group sequence: +M1, −M1. As shown in FIG. 1, this group corresponds to the group corresponding to message element 01. In a similar manner, delay circuit 105 is coupled to the output of matched filter 103, and their outputs are selectively combined in adder 108 and subtraction circuit 109 to provide signals representative of symbol groups +M2, +M2 and +M2, −M2. Each of these outputs corresponds to a respective symbol group and is coupled to network 110, the respective outputs of which are coupled to threshold detector unit 123. The threshold detectors of threshold detector unit 123 compare the respective outputs of network 110 to a reference threshold indicative of the detection of a symbol group. When any of these threshold units is triggered, an output is produced on output line 111. Line 111 is coupled to a maximum value detection circuit which is coupled to the outputs of each of network 110. Maximum level detection circuit 120 provides an output indicative of which of the combined signal levels on lines 124-127 is the largest, when enabled by a signal on line 111. This signal is coupled to message decoder 121, which may be comprised of decoding combinational logic, the output of which contains the original bits of the detected message element group.

A significant feature of the signal acquisition and recovery scheme described above is the fact that, unlike conventional data demodulation systems and, in particular, spread spectrum systems, preserving both the A and B quadrature components of the symbol correlation, and including those in the coherent group code sum of symbols, produces a maximum likelihood coherent decision output $\sqrt{\Sigma A^2 + \Sigma B^2}$ which is independent of $\theta$, the carrier phase. As a result, no signal tracking i.e. synchronization circuitry, such as a phase lock loop is required. The time invariant property of the hybrid array correlator, coupled with the maximum likelihood decision process, reduces the complexity of the data recovery circuitry while permitting a sophisticated encoding technique to be employed.

Having described the signal acquisition circuitry, including the hybrid array correlator, that may be employed in accordance with the present invention, the explanation to follow will detail the make up of an exemplary transmitter configuration that may be employed to generate the respective symbol groups. As a further feature of the invention, a scheme for changing the chip sequences by way of which each symbol is defined will be described. This latter feature is especially advantageous in anti-jam applications where the need to change the spreading function as a security measure against jamming is required.

More specifically, present day security requirements have established a maximum time interval, termed a code validity interval (CVI), over which a spreading function may be safely employed before an intelligent jammer begins to learn the anti-jam sequence and undertakes an anti-jam measure against it. This code validity interval may be on the order of 100 milliseconds. Now, if one were to employ a first prescribed security code for an entire code validity interval and then suddenly switch to a completely different security code for the succeeding code validity interval, and so on, this "hard edged" changeover may create severe problems at the receiver, since the receiver correlator operates asynchronously; yet obvious precise synchronization of the "hard edged" spreading sequence changeover would be necessary to ensure data acquisition. To circumvent this problem of hard edged sequence changeover while still satisfying the code validity interval criteria, the present invention employs a technique of changing the respective spreading sequence by way of which each symbol is defined while satisfying the code validity interval requirement, yet without the need for complex synchronization equipment at the receiver. More particularly, in accordance with a further aspect of the present invention, within each successive code validity interval, the spreading sequence for each symbol is altered or changed in a gradual manner, over the duration of the interval, into a new spreading sequence by which the symbol is to be defined in the next successive code validity interval. This change of the spreading sequence over the duration of the code validity interval is slow enough to enable correlation at the receiver, wherein a similar change in the spreading sequence is taking place. Advantageously, because of the time invarient property of the hybrid array correlator and the maximum likelihood decision process carried out for signal acquisition, complex circuitry for ensuring synchronization between the changeover of the spreading functions at receiver and transmitter is unnecessary.

Figure 7:
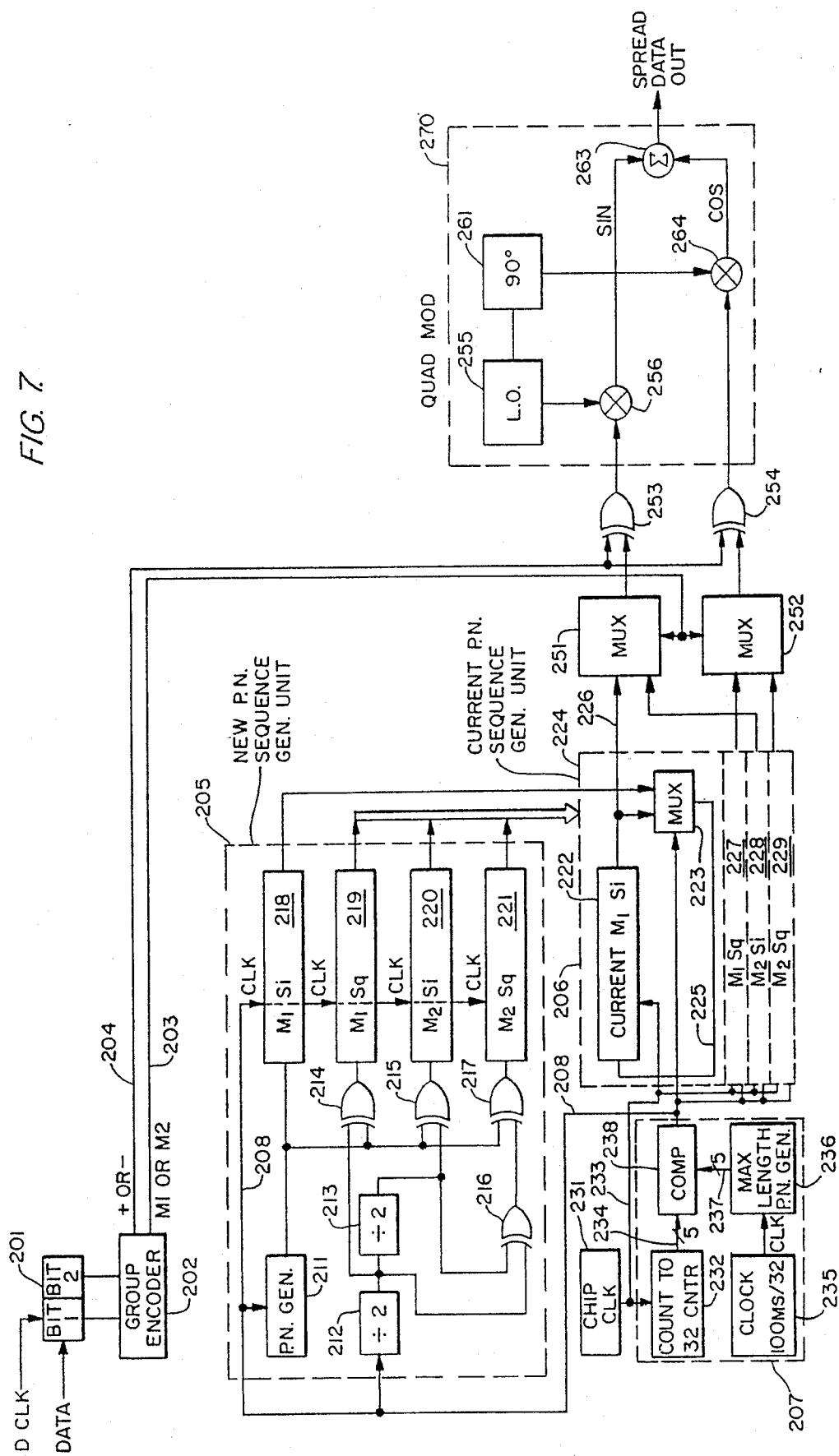
FIG. 7 is a schematic diagram of the configuration of a transmitter in which a "soft edged" spreading sequence changeover is capable of being carried out.

Referring now to FIG. 7, a schematic diagram of the configuration of a transmitter, in which a "soft edged" spreading function changeover is carried out, is shown.

Again in keeping with the quaternary symbol format adopted for the purposes of the present description, with each basic message element being comprised of a sequence of two bits, incoming data is applied to a message bit pair register 201. As each successive pair of bits of data is loaded into the register under the control of a data clock, a group encoder circuit 202, connected to the respective stages of register 201, converts the two bit data sequence into a four bit group code, corresponding to the relationships illustrated in FIG. 1 described previously. It is to be observed that the data is clocked in two bits at a time and dumped from the message bit pair register. Group encoder 202 may comprise combinational logic for the example illustrated here, or in the general case, may comprise a PROM where larger sized message data bit sets are employed and the number of symbols per group is greater than the pairs in the present example. Using the quaternary symbol configuration of the present example, group encoder 202 selectively produces output signals on lines 203 and 204. Output line 203 is coupled to a pair of multiplexers 251 and 252. Line 203 carries a signal representing whether the symbol produced by the bit pair in register 201 corresponds to symbol M1 or M2. Line 204 carries a signal indicative of whether or not the symbol M1 or M2 has a positive of negative polarity. Line 204 is coupled to one input of each of a pair of exclusive OR gates 253 and 254.

For the purpose of producing the spreading sequences corresponding to each of the signals to be transmitted, a current spreading sequence generator unit 206 is employed. This sequence generator unit contains a plurality of current spreading sequence generators 224, 227, 228 and 229, respectively identifiable with symbols +M1, −M1, +M2, and −M2, respectively. Each current spreading sequence generator contains a multistage shift register and multiplexer feedback loop from which is produced the spreading sequence for that particular symbol. For this purpose, a chip clock generator 231 is coupled to each sequence generator and to a count to 232 counter 232 over line 233. For purposes of simplifying the drawing, the detailed make up of an individual spreading current sequence generator, specifically that of current generator 224 is shown, while generators 227, 228 and 229 are shown simply in block diagram format.

Within current spreading sequence generator 224 there is provided a multi bit shift register 222, the number of bits of which corresponds to the chip length, so that shift register 222 is a 32 stage shift register. A chip sequence is clocked into shift register 222 over line 225 under the control of the chip clock 231. The output of shift register 222 is coupled over line 226 to one input of multiplexer 251 and to one input of multiplexer 223. Multiplexer 223 has a second input coupled to the output of a corresponding shift register 218 within new spreading sequence generator unit 205. Multiplexer 223 is controlled by a signal on line 208 from a comparator 238 within what is referred to as a random walk generator 207. Random walk generator 207 performs the function of gradually or softly changing the individual chips of a spreading sequence for each symbol over the code validity interval, described above. For this purpose, random walk generator includes a clock 235 which produces an output clock signal which depends upon the clock validity interval and the length of a spreading signal sequence. Using the example of the 100 millisecond code validity interval described above and a 32 chip sequence for the present embodiment, clock 235 produces a clock signal once every 3.125 milliseconds. This clock signal is coupled to a maximal length PN sequence generator 236 which, in the present example, may be a conventional five stage 31 bit maximal length sequence generator. Maximal length PN sequence generator 236 produces a five bit maximal length sequence of 31 randomly produced codes and recycles. Such a generator is usually configured of a shift register and a set of exclusive OR gates selectively coupled to respective stages connected a feedback configuration. The stages of the shift register within maximal length PN sequence generator 236 are coupled over data length 237 to a comparator 238. Also coupled to comparator 238 are the contents of counter 232, namely for a divide by 32 counter, counter 32 may comprise a five bit sequential stage binary counter, the contents of the five stages of which are coupled over link 234 to a second input of comparator 238. Comparator 238 produces an output signal on line 208. Whenever the count value of counter 232 matches that contained in the respective stages of maximal length sequence generator 236, an output signal is produced which causes multiplexer 223 within each of current PN sequence generators 224, 227, 228 and 229 to couple the output of a respective shift register 218, 219, 220 and 221, within new spreading sequence unit 205, to the first stage of the shift register of the respective current spreading sequence generator within current spreading sequence generator unit 206.

New spreading sequence generator unit 205 contains a plurality of respective shift registers, each 32 bits in length, for the 32 chip random sequence codes defining the respective quaternary symbol alphabet of the present example. These shift registers 218, 219, 220 and 221 respectively provide 32 chip spreading sequences for the in-phase and quadrature components of each of symbols M1 and M2 respectively, as shown. The manner in which the respective spreading sequences are generated may be any number of commonly used schemes. For example, a typical scheme, illustrated in FIG. 7, contains a spreading sequence generator 211 clocked by the output of comparator 238 on line 208. The output of PN generator 211 is coupled to shift register 218 directly and to each of a plurality of exclusive OR gates 214, 215 and 217. The clock signal on line 208 is coupled to a divide by 2 divider 212, the output of which is coupled to a second input of exclusive OR gate 214 and to one input of an exclusive OR gate 216. To the output of the first divide by 2 divider 212, a second divider 213 is coupled, the output of which is coupled to a second input of exclusive OP gate 216 and to a second input of exclusive OR gate 215. The output of exclusive OR gate 216 is coupled to the second input of exclusive OR gate 217. The outputs of each of exclusive OR gates 214, 215 and 217 are coupled to the first stage input of shift registers 219, 220 and 221, respectively. In response to clock signals on line 208, PN sequence generator 211 produces a random sequence of ones and zeros at its output. The PN sequence is shifted directly through shift register 218 under the control of clock on line 208, which also clocks the additional shift registers 219–221. However, the spreading sequences that are clocked into the remaining three registers 219, 220 and 221 will differ in dependence upon the divider and exclusive OR gate circuitry described above, in a conventional fashion. The last stage or the 32nd stage of each of these shift registers is coupled as one input of each of the respective multiplexers within the current spreading sequence generators contained within the current spreading sequence generator unit 206.

Considering now the output of the current spreading sequence generator unit 206, each of the in-phase spreading sequences is coupled as one input of multiplexer 251 while the quadrature phase spreading sequences are coupled as inputs to multiplexer 252. The output of multiplexer 251 is coupled as a second input of exclusive OR gate 253 while the output of multiplexer 252 is coupled as a second input of exclusive OR gate 254. The output of exclusive OR gate 253 is coupled to a mixer 256 which receives the I.F. oscillator output of local oscillator 255 and couples its output to one input of a summing circuit 263. A 90° phase shifter 261 is also coupled to the output of local oscillator 255 and supplies a cosine reference input to a mixer 262. A second input to mixer 262 is coupled to the output of exclusive OR gate 254. The resultant cosine output of mixer 262 is coupled as a second input of adder 263, the output of which is representative of the spread I.F. data signal.

Considering now the operation of the transmitter, let us assume that each of the shift registers within each respective current spreading sequence generator contains some 32 bit sequence. This sequence is clocked through the shift register and its associated multiplexer and back into the shift register under the control of shift clock 231. Ignoring for the moment the manner in which each spreading sequence is softly changed over the code validity interval to change spreading sequence, the output data from each spreading sequence generator unit will be selectively coupled through one of multiplexers 251 and 252 and through exclusive OR gates 253 and 254 to guadrature modulator 270 for generation of a spread I.F. modulated data signal. Depending upon the action of group encoder 202, one of multiplexers 251 and 252 will be selected and the appropriate polarity will control the operation of exclusive OR gate 253 and exclusive OR gate 254 to provide the proper spreading sequences at their outputs with respective symbols being transmitted. The signals are mixed with the local oscillator sine and cosine outputs and are converted for eventual transmission.

As pointed out above, a significant aspect of the present invention relative to the manner in which the symbols are generated is its ability to gradually or softly change each spreading sequence over a prescribed code validity interval. For this purpose, maximal length PN generator 236 is clocked through its entire code once for the code validity interval. Every time comparator 238 sees a match between the state of maximal length generator 236 and the clock count of counter 232, it produces an output signal on line 208. This causes multiplexer 223 to replace whatever bit is in the particular stage of shift register 222 and the other shift register stages of each current sequence generator at the time the output of the chip clock 231 on line 233 causes counter 232 to be producing an output that is equated with the contents of the maximal length PN generator 236. At this time, multiplexer 223, instead of coupling the output of the shift register 222 back to its input as it normally does, substitutes whatever state the last stage of 218 is at that time into the first stage of shift register 222. The signal on line 208 also clocks a new bit into each of registers 218, 219, 220 and 221 from PN generator 211 so that new spreading sequence generator unit 205 is continually updating or generating a new spreading sequence to be available for each of the symbols to be transmitted. Eventually, over the entire 32 bit span of the code validity interval, the original PN sequence which was contained within each shift register within each current spreading sequence generator will have its spreading sequence changed to an entirely new code. However, this will occur on a random bit basis because of the generation or use of a maximal length PN sequence produced within random walk generator 207. Namely, the bit within each shift register, such as shift register 222 in the current spreading sequence generator unit 206, which undergoes a change, will change in a random manner as determined by maximal length PN sequence generator 236. Since the spreading sequences that define the respective symbols to be transmitted change slowly over the code validity interval, correlation at the receiver, in which there is a corresponding change in the reference codes, is maintained, even though there may not be perfect time alignment between the transmitter and the receiver. As pointed out previously, since each hybrid array correlator is time invariant, synchronization of the reference spreading code with incoming unknown data is not required, so that signal tracking circuitry is unnecessary. It should be observed, however, that within each receiver there is a corresponding set of spreading sequence generator units such as units 205 and 206 in the transmitter. To ensure that the symbol sequence generator in the receiver is updated in the same manner that new symbol sequences are produced at the transmitter, the same fundamental PN generator employed at the transmitter is also employed in the receiver. During an initialization phase of operation, a reference symbol may be transmitted, to be detected by a specific matched filter. Within the hybrid array correlator of that matched filter, whichever stage detects alignment with the reference symbol sequence produces an output for resetting the local PN generator unit in the receiver, so that the updating of the symbols over each successive code validity interval will follow the manner in which the updating occurs at the transmitter.

Through the above scheme of making the chip sequences defining each symbol effectively variable for each successive code validity interval, it can be seen that the data communication technique in accordance with the present invention, including the correlator scheme employed at the receiver for requiring each successive symbol, is programmable. Namely, one can cause each hybrid array correlator to be responsive to a particular symbol sequence simply by prescribing the symbol sequence that the correlator is to match and then loading that symbol sequence into the respective stages or cells of the correlator. Once placed into operation, that symbol sequence to be acquired continually recirculates until replaced by a new reference spreading sequence.

In the above described configuration of an individual correlator cell, shown in FIG. 4, respective Miller integrators are coupled to the outputs of the summing circuits for the A and P channels. At the end of successive pseudic symbol times Ts, the contents of the integrators are read out and then dumped one-half a chip delay time later. In place of the Miller integrator circuits, alternate implementations comprised of digital configurations as shown in FIGS. 8 and 9 may be employed.

Figure 8:
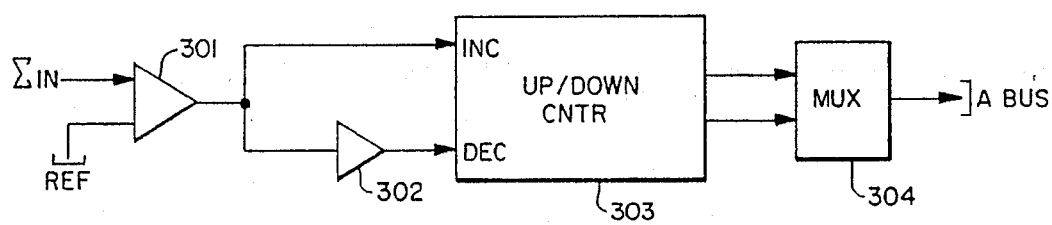
FIGS. 8 and 9 show modifications of the integrator circuitry that may be employed in the hybrid array correlator in accordance with the present invention.

In the configuration shown in FIG. 8, the output of a cell summing circuit, such as adder 37 in FIG. 5, may be coupled to a threshold comparator 301. Comparator 301 effects a binary output indicative of whether or not the output of the adder is greater than a reference value. The binary ("1" or "0") of comparator 301 is coupled to an up/down counter 303, directly and through an inverter 302. Whenever the output of comparator 301 is a binary "1", the contents of counter 303 are incremented; whenever the output of comparator 301 is a binary "0", the contents of counter 303 are decremented. The contents of counter 303 totalled over a symbol time are coupled through multiplexer 354 onto the A bus for subsequent digital processing.

Figure 9:
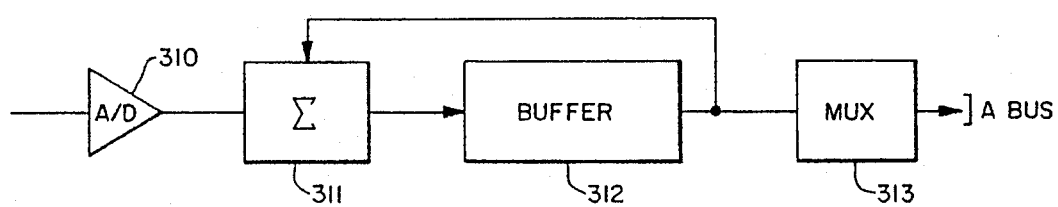

In the configuration shown in FIG. 9, the output of the cell summing circuit is digitized by analog to digital converter 310. The digital output of A/D converter 310 is coupled to adder 311 the output of which is stored in buffer 312. The output of buffer 312 is coupled to adder 311, so that adder 311 and buffer 312 together form an accumulator. The output of buffer 312 is coupled to multiplexer 313, the output of which is coupled to a respective A or B bus.

While I have shown and described one embodiment in accordance with the present invention, it is understood that the same is not limited thereto but is susceptible of numerous changes and modifications as are known to a person skilled in the art, and I therefore do not wish to be limited to the details shown and described herein but intend to cover all such changes and modifications as are obvious to one of ordinary skill in the art.

What is claimed:

1. A signal processing apparatus comprising:
   a plurality N of first means for correlating a first signal with a second signal and generating an output representative of the correlation between said first and second signals;
   second means for applying said first signal in parallel to each of said first means; and
   third means for continuously applying said second signal to each respective one of said first means at a time that is offset relative to the time of application of said second signal to any other respective one of said first means.

2. A signal processing apparatus according to claim 1, further including fourth means, coupled to receive the outputs of each of said first means and producing an output signal indicative of the correlation between said first and second signals among the first means of said plurality.

3. A signal processing apparatus according to claim 1, wherein said third means comprises a respective delay means associated with each of said first means for delaying said second signal applied to a respective $i^{th}$ one of said first means by a prescribed delay time and applying the delayed second signal to the $(i+1)^{th}$ one of said first means, and wherein the output of the $N^{th}$ delay means is coupled to supply the delayed second signal output thereof to the first one of said plurality of first means.

4. A signal processing apparatus according to claim 3, wherein said second signal comprises a K chip spreading sequence, the delay imparted by each of said delay means is equal to one-half a chip time and the plurality N of first means is equal to $2^K$.

5. A signal processing apparatus according to claim 1, wherein said second signal comprises a K chip spreading sequence, with the signal span of said pluralilty N of first means convering the duration of said K chip spreading sequence.

6. A signal processing apparatus according to claim 1, wherein each of said first means comprises a switch having a signal input coupled to receive said first signal, a control input coupled to receive said second signal and an output coupled to an integrator, from the output of which said output representative of the correlation between said first and second signals is generated, said switch connecting its signal input to its output in accordance with the signal content of said second signal.

7. A signal processing apparatus according to claim 6, further including means for reading out the contents of each respective integrator at the termination of said second signal being applied to each respective first means.

8. A signal processing apparatus according to claim 1, wherein said second signal is comprised of in-phase and quadrature-phase spreading sequences Si(t) and Sq(t), respectively and said first signal is comprised of an in-phase component I(t) and a quadrature-phase component Q(t), respectively defined by $$I(t) = D(t)[Si(t) \cos \theta - Sq(t) \sin \theta] \text{ and}$$

$$Q(t) = D(t)[Si(t) \sin \theta + Sq(t) \cos \theta],$$

where D(t) is a data modulation signal, and $\theta$ relates to the carrier phase of said first signal to said plurality of first means.

9. A signal processing apparatus according to claim 8, wherein each of said first means includes means for producing first and second correlation outputs A(t) and B(t) defined in accordance with the relationships:

$$A(t) = \int_0^{Ts} (I(t)Si(T) + Q(t)Sq(t))dt$$

and $$B(t) = \int_0^{Ts} (I(t)Sq(t) - Q(t)Si(t))dt.$$

where Ts is the symbol time span of said first signal.

10. A signal processing apparatus according to claim 9, wherein each of said first means comprises a plurality of switches, each of which has a control input selectively coupled to receive, as said second signal, a delayed version of one of the signals $Si(t)$, $\overline{Si(t)}$, $Sq(t)$, $\overline{Sq(t)}$, a signal input selectively coupled to receive, as said first signal, one of the signals $I(t)$, $\overline{I(t)}$, $Q(t)$, $\overline{Q(t)}$, and an output, the outputs of said switches being selectively combined and coupled to integrator means for producing said outputs $A(t)$ and $B(t)$.

11. A signal processing apparatus according to claim 10, wherein each of said switches is formed of a field effect transistor, one of the source and drain of which corresponds to its signal input, the other of the source and drain of which corresponds to its output, and the gate electrode of which corresponds to its control input.

12. An apparatus for encoding and transmitting coherent communication signals comprising:
first means for receiving information signals and encoding said information signals into respective groups of intermediate signals which have maximized and equalized energy spacing with respect to one another;
second means, coupled to said first means, for generating for each of said groups of intermediate signals a coherent plurality of symbols in the form of respective spreading sequences and including means for controllably varying the spreading sequences by way of which the respective symbols are formed, so that for successive prescribed time intervals each symbol is formed of a respectively different sequence; and
third means, coupled to said second means, for modulating an output carrier by spreading sequences of said symbols.

13. An apparatus according to claim 12, wherein the spreading sequence of which a symbol is formed comprises a K chip PN sequence, and said second means includes means for selectively changing the state of each chip in a random order over the span of the K chip sequence.

14. An apparatus according to claim 13, wherein said selectively changing means includes means for selectively changing, in a random order, the state of each chip once during a respective prescribed time interval.

15. A communication system comprising:
at a transmitting station;
first means for receiving information signals and encoding said information signals into respective coherent groups of intermediate signals which have maximized and equalized energy distance with respect to each other;
second means, coupled to said first means, for generating for each of said groups of intermediate signals a plurality of symbols in the form of respective spreading sequences and including means for controllably varying the spreading sequences by way of which the respective symbols are formed, so that for successive prescribed time intervals each symbol is formed of a respectively difference sequence; and third means, coupled to said second means, for modulating an output carrier by the spreading sequences of said symbols and causing said carrier to be transmitted to a receiving station;
at a receiving station;
fourth means, for demodulating a received signal to obtain said respective spreading sequences;
fifth means, coupled to said fourth means, for correlating said obtained spreading sequences with respective ones of a set of reference spreading sequences defining the symbols capable of being transmitted; and
sixth means, coupled to said fifth means, for deriving, from the correlated outputs of said fifth means, respective coherent groups of said intermediate signals and recovering therefrom said information signals.

16. A communication system according to claim 15, wherein the spreading sequence of which a symbol is formed comprises a K chip PN sequence, and said second means includes means for selectively changing the state of each chip in a random order over the span of the K chip sequence.

17. A communication system according to claim 15, wherein said selectively changing means includes means for selectively changing, in a random order, the state of each chip once during a respective prescribed time interval.

18. A communication system according to claim 15, wherein said fifth means comprises a set of matched filters the response characteristics of which are uniquely associated with respective ones of said symbols, and
said sixth means comprises means for deriving, as a respective group of said intermediate signal, that group associated with those symbols whose correlation outputs of said fifth means correspond to a prescribed maximum signal characteristic criterion.

19. A communication system according to claim 17, wherein each of said matched filters comprises a hybrid array correlator which includes
a plurality of correlator cells, each of which is coupled to correlate the spreading sequence output of said fourth means with a plurality of reference symbol sequences on a continuing time basis, each reference symbol sequence applied to a respective correlator cell having the same chip sequence as those applied to the other cells of the correlator, but being shifted in time relative thereto.

20. A communication system according to claim 19, wherein each hybrid array correlator is comprised of 2K correlator cells, where K is the number of chips in the reference symbol sequence, which sequence is associated with that particular matched filter, each $i^{th}$ correlator cell being coupled to receive said reference symbol spreading sequence and delaying said sequence by one-half a chip time as it couples the delayed sequence to the $(i+1)^{th}$ correlator cell, the spreading sequence output of said fourth means being coupled to each of said 2K correlator cells in parallel, with the delayed reference spreading sequence output of the $2K^{th}$ cell being coupled to the first correlator cell.

* * * * *